United States Patent

[11] 3,628,437

[72] Inventor Paul Fahlenberg
Baierbrunn, Germany
[21] Appl. No. 816,307
[22] Filed Apr. 15, 1969
[45] Patented Dec. 21, 1971
[73] Assignee Compur-Werk Gesellschaft mit beschrankter Haftung & Co.
Munich, Germany
[32] Priority Apr. 18, 1968
[33] Germany
[31] P 17 72 237.1

[54] PHOTOGRAPHIC CAMERA
2 Claims, 5 Drawing Figs.

[52] U.S. Cl. .................................................... 95/53 E,
95/53 EA, 95/53 EB
[51] Int. Cl. ...................................................... G03b 9/58
[50] Field of Search ........................................... 95/11, 53 E,
53 EA, 53 EB, 63

[56] References Cited
UNITED STATES PATENTS

| 3,348,460 | 10/1967 | Schmitt | 95/53 EA |
| 3,504,611 | 4/1970 | Richter et al. | 95/63 X |
| 3,065,387 | 11/1962 | Dean | 95/53 EA |
| 3,348,462 | 10/1967 | Fahlenberg | 95/53 EA |
| 3,526,181 | 9/1970 | Fahlenberg et al. | 95/53 EA |

*Primary Examiner*—Joseph F. Peters, Jr.
*Assistant Examiner*—Robert P. Greiner
*Attorneys*—Charles Shepard and Stonebraker & Shepard ABSTRACT: A photographic camera in which the exposure time or shutter speed is controlled by an electronic time control arrangement set into operation by an electronic switch operated by an electrical impulse. The initiating impulse is preferably derived from a gate, which may take various forms. In one disclosed form, the impulse is produced by a magnetic gate; in another, by a photoelectric gate; and in a third form, by a capacitive gate.

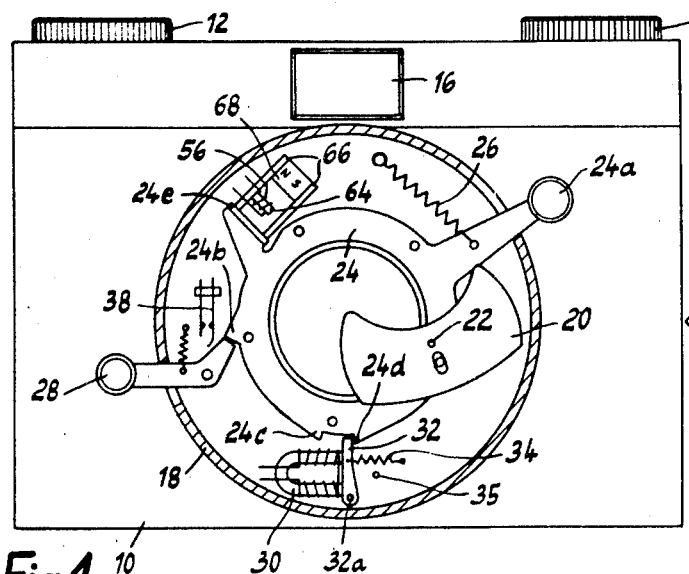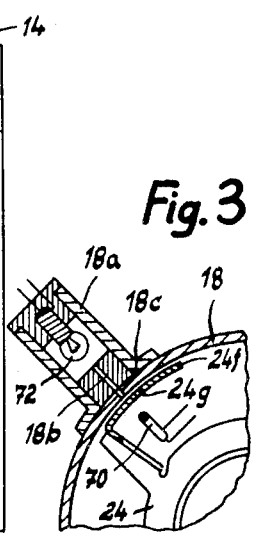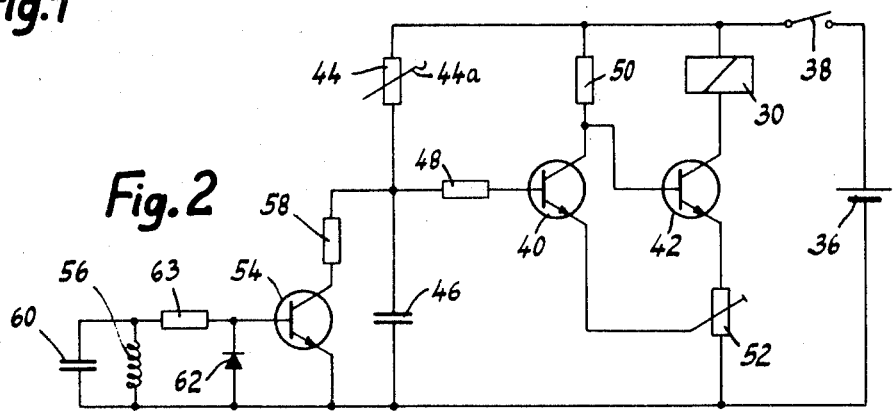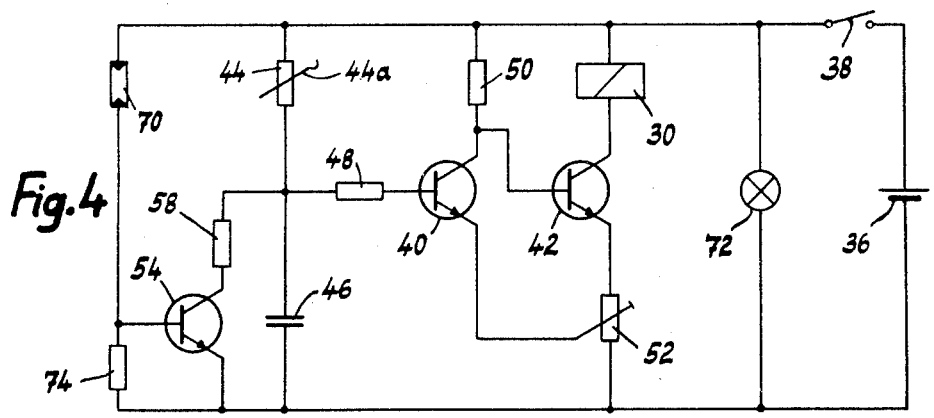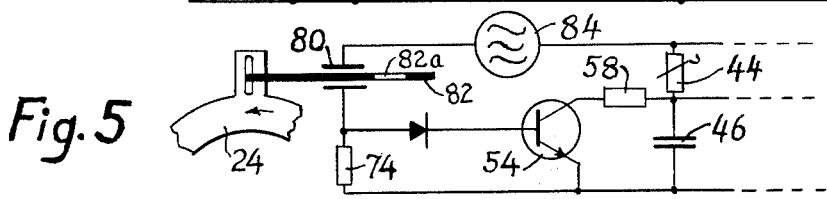

3,628,437

PHOTOGRAPHIC CAMERA

BACKGROUND OF THE INVENTION

Electronic time-determining circuits are well known in the photographic art, for determining the time of exposure, often referred to as the shutter speed. In the known arrangements, the time-determining operation is initiated by closing a mechanical switch. As a rule, these mechanical switches have contact springs which are struck by a member which is moved to perform the tripping or triggering of the shutter, or by a member which runs down after the shutter has been tripped, to operate the spring or springs to close the contact switch. Such contact assemblies are liable to the phenomena known in the art as "bounce," which in turn produce undesirable irregularities in the timing of making the contact which is necessary to initiate the time-determining operation of the circuit, and consequently are detrimental to the reliability and efficiency of the assembly.

It is an object of the present invention to overcome these defects of mechanical switches, and to provide an arrangement which serves for starting the electronic time-determining operation at a switching instant which can be accurately repeated with relation to the commencement of the photographic exposure.

Another object of the invention is the provision of an exposure time-determining circuit or arrangement, operation of which is initiated by an electronic switch, not subject to "bounce" and similar undesirable irregularities, as distinguished from a mechanical switch which is subject to "bounce."

Still another object of the invention is the provision, in such a time-controlling arrangement, of an electronic switch which is set into operation by means of an electrical impulse.

A further object is the provision of such an arrangement in which the electrical impulse referred to is produced by a gate. According to other features of the invention, the gate may take various forms. In one embodiment of the invention, the gate is a magnetic gate; in another embodiment, a photoelectric gate is used; and in a third embodiment, a capacitative gate controls the electric impulse which operates the electronic switch.

A still further object of the invention is the provision, in a photographic camera, of a time-determining arrangement for the shutter in which the impulse-producing gate operates independently of the shutter trigger or trip member, and is operated instead by a movable element of the shutter.

BRIEF DESCRIPTION OF THE DRAWINGS

In the accompanying drawings, incorporated herein by reference and constituting a material part of the disclosure and relating to an exemplary embodiment of the invention:

FIG. 1 is a front elevation of a photographic camera and shutter with the front portion of the shutter removed to show the interior construction somewhat schematically, illustrating mainly the mechanical features of the shutter with parts of the electrical mechanism; according to a first embodiment of the invention;

FIG. 2 is a wiring diagram of the circuit used with the shutter embodiment shown in FIG. 1;

FIG. 3 is a fragmentary front view, similar to a portion of FIG. 1, illustrating parts of a second embodiment of the invention;

FIG. 4 is a wiring diagram of the circuit used with the embodiment shown in FIG. 3; and FIG. 5 is a schematic view partly mechanical and partly in the form of a wiring diagram, illustrating a third embodiment of the invention.

DESCRIPTION OF THE PREFERRED EMBODIMENTS

Referring first to FIG. 1, there is illustrated a photographic camera shown in general at 10, which may be of any suitable known construction except for the arrangement for determining the exposure interval or shutter speed as further described below. The conventional parts of the camera may include, for example, a film-feeding knob 12, a rewinding knob 14, and a viewfinder window 16. Mounted on the front wall of the camera is an objective shutter having a housing 18. The shutter blades may be of any conventional known form, the details of which are not important for purposes of the present invention. For example, they may be double-lobe blades such as shown at 20, several blades being used as well understood in the art, but only one blade is illustrated for the sake of clarity of the drawings. Each blade is mounted to swing, for example, on a fixed pin 22 in the shutter housing, and has a slot engaged by a pin on the shutter blade driving ring (frequently called merely the "blade ring") 24 which is rotatable about the central exposure aperture of the shutter, and thus rotates about the optical axis.

A spring 26, constituting the main spring or master spring, tends to drive the blade ring 24 in a counterclockwise direction when viewed from the front as in FIG. 1. The shutter is cocked or tensioned ready for exposure by moving the blade ring 24 in a clockwise direction in any suitable manner, as for example by applying clockwise pressure to a handle extension 24a which extends out through a slot in the housing 18 to an accessible position, and when the mechanism is tensioned, the blade ring is held in tensioned or cocked position by a releasable latch 28, the nose of which drops behind a projection 24b on the blade ring 24.

During the clockwise tensioning movement, the shutter blades 20 are swung from one extreme position to the other, and during this movement, they are opened and closed. To insure that no exposure takes place during the tensioning operation, masking blades, often known in the art as "shutter blind" blades, are used in a manner well known in the art, as customary when employing shutter blades of the double-lobe-type, movable in one direction to tension the shutter and in the opposite direction to make the exposure. Such masking blades or shutter blind blades are not illustrated, because they are well known in the art and the details are not important for purposes of the present invention. Of course if the main shutter blades are of another type, not needing masking blades, they would not be used. During the making of a photographic exposure, when the trigger or release 28 is operated, the spring 26 causes the blade ring 24 to run down in a counterclockwise direction, thereby moving the shutter blades 20 from the position illustrated in FIG. 1 to the opposite extreme position, momentarily opening the exposure aperture to passage of light, and then closing it again.

An electromagnet 30 is mounted in the shutter housing 18. The armature of this electromagnet is in the form of a lever 32 pivotally mounted at 32a and biased by a weak spring 34 which tends to swing the armature 32 in a clockwise direction against a fixed stop 35. The free end of the armature projects into the path of travel of the blade ring 24 and cooperates alternately with two projections 24c and 24d on the blade ring, in a way which is further described below.

This electromagnet 30 is in the circuit of an electronic arrangement for determining the exposure time, the wiring diagram of this arrangement being shown in FIG. 2. It comprises a battery 36 which serves as the current source, a switch 38, and two feedback transistors 40 and 42. A time-controlling resistor 44 and a capacitor 46 constitute the RC-member (resistance-capacitance member) of this arrangement. There are further resistors 48 and 50, arranged in the circuit as indicated, and a potentiometer 52 is used to adjust the circuit. Associated with the capacitor 46 is a further transistor 54 which is rendered conductive by an impulse coming from a gate. The gate may take various forms. In the embodiment illustrated in FIGS. 1 and 2, the impulse which renders the transistor 54 conductive comes from an induction gate including a winding 56. The form of the induction impulse is determined by a capacitor 60, a diode 62, and a resistor 63. All of these elements are connected to each other in the manner indicated in FIG. 2, the connections being readily understandable by those skilled in the art. When the impulse from the induction gate renders the transistor 54 conductive, it acts as a short circuit for the capacitor 46 and allows this capacitor to discharge through the resistor 58 and the transistor 54.

The inductive winding 56 surrounds a transverse metallic pin 64 connected to the pole pieces 66 of a permanent magnet 68 secured in the shutter housing 18. The blade ring 24 has a metallic lug 24e which engages against the free ends of the pole pieces 66, in the vicinity of the winding 56, when the blade ring 24 is in the tensioned or cocked position.

This first embodiment of the invention, as described above, operates as follows:

After an exposure has been made, and before making the next exposure, the blade ring 24 is moved from its rest or rundown position to its tensioned or cocked position, by moving the arm 24a in a clockwise direction, and it is held in tensioned position by the latch 28. During the tensioning movement, the projection 24d of the ring 24 engages the end of the armature 32 and swings the armature on its pivot 32a, from its rest position against the abutment 35, to the cocked position illustrated in FIG. 1, in which the armature 32 is against the electromagnet 30. At this time the electromagnet 30 is not energized, but the projection 24d serves to maintain the armature against the magnet, against the force of the light spring 34 which tends to move the armature away from the magnet. In this tensioned position of the blade ring 24, the arm 24e thereof bears against the pole pieces 66 of the permanent magnet 68.

The required exposure time or shutter speed depends on the resistance value of the resistor 44. If the camera is designed for manual setting of the shutter speed, the resistance value is manually set by moving a slider schematically shown at 44a. If the camera is designed for automatic control of the exposure time, the resistor 44 may be a photoresistance, the resistance of which varies in accordance with the intensity of light reflected to the camera from the object being photographed. Both manually settable resistors and photoresistances are known in the art, and it is immaterial to the present invention which type of resistance is used.

If the trigger or trip 28 is now actuated, the switch 38 associated therewith (as seen in FIG. 1) is closed, and the battery 36 is thus operatively connected into the circuit. At this time, the capacitor 46 of the RC-member still has a residual charge remaining from the preceding exposure, but this charge must be dissipated before the new exposure is made, because the residual charge from the preceding exposure is not of constant magnitude and therefore is not suitable as a starting point for the new charge which the capacitor should carry in order to time the new exposure. However, the residual charge from the previous exposure is always less than the base of the emitter potential of the first transistor 40. When the switch 38 is closed, there is a voltage drop when the battery 36 is connected to the common emitter-resistor 52. This voltage drop increases that of the emitter of the transistor 40, and the voltage of this transistor does not positively reach the breakdown value at this time. Thus the transistor 40 is blocked, while the transistor 42 is conductive and the electromagnet 30 thereby becomes energized because of the conductivity of the transistor 42. This holds the armature 32 against the electromagnet 30, in the position shown in FIG. 1.

Upon actuation of the trigger 28, the blade ring 24 starts to run down in a counterclockwise direction under the influence of the spring 26. This moves the metallic arm 24e away from the permanent magnet 66, 68 and thereby produces a temporary induction impulse in the winding 56. This is transmitted as an impulse to the transistor 54, which as a result becomes conductive for a short interval and while it is conductive it short-circuits the capacitor 46, allowing discharge of this capacitor from whatever residual voltage was on the capacitor, to zero voltage. Immediately after this discharge, the recharging of the capacitor 46 from the battery 36 begins, this recharging taking place through the capacitor 44 which, as above indicated, has a value dependent upon the desired length of exposure, either because of previous manual setting or because of a photoresistance effect. The transistor 54 does not short circuit the new charge which is now placed on the capacitor 46, because this transistor 54 remains conductive only during the very short interval that the impulse from the inductive coil 56 is impressed on it, which is only long enough to disspell the previous residual charge.

The transistor 54 thus represents an electronic switch which is activated by an impulse produced by a gate (in this instance a magnetic inductance gate) and determines the starting of the functioning of the electronic arrangement for controlling the exposure time, namely, the commencement of charging of the capacitor 46. Although the switch 38 is a mechanical switch, it is not this switch but rather the electronic switch 54 which initiates the time-determining functioning of the circuit. If there is any bounce in the switch 38, possibly causing irregularity in the time interval between the closing of this switch and the beginning of movement of the blade ring 24, this irregularity does not matter. It is only when the blade ring 24 begins to move in its running down movement that the member 24e is pulled away from the magnet 66, 68, thereby producing the impulse in the coil 56 which operates the electronic switch 54, which thus operates always in a perfectly uniform timed relationship to the opening of the shutter, insuring uniformity of the beginning of the timing cycle in all exposures, with respect to the beginning of the shutter-opening movement.

As the blade ring 24 begins to move counterclockwise, it not only pulls the member 24e away from the magnet 66, 68, but also begins to open the shutter blades 20. The projection 24d on the blade ring 24 moves away from the end of the armature 32 of the electromagnet 30, but the spring 34 cannot pull the armature away from the electromagnet because the electromagnet is energized at this time, since the switch 38 is closed at this time and current from the battery 36 flows through the transistor 42 which is conductive at this time as above explained. Therefore, the blade ring 24 only runs down partially, through approximately one-half of its full movement, until the projection 24c on the blade ring comes into contact with the armature 32 held against the electromagnet as aforesaid, and this stops the further running-down movement of the blade ring temporarily, in a position in which the shutter blades are fully open. The blades remain open as long as the electromagnet 30 remains energized.

After the expiration of a time interval measured by the charging of the capacitor 46 through the resistor 44, the capacitor 46 reaches the breakdown voltage of the trigger, and the trigger sweeps. At this instant, the transistor 40 becomes conductive, and the transistor 42 is blocked, thereby deenergizing the electromagnet 30. The armature 32 now drops away from the electromagnet, swinging in a rightward direction, so that it no longer obstructs the portion 24c of the blade ring 24, and the blade ring can now resume its counterclockwise running-down movement, to close the shutter blades 20 and terminate the exposure.

As already mentioned, the gate which produces the electrical impulse for initiating the electronic switching (i.e., for making the transistor 54 momentarily conductive) may be of various forms. In the first embodiment of the invention, disclosed in connection with FIGS. 1 and 2, this gate was a magnetic inductive gate. However, another possible form, within the scope of the invention, is a photoelectric gate, here disclosed as a second embodiment in connection with FIGS. 3 and 4.

In this second embodiment, the shutter housing 18 is provided with a lamp housing 18a containing a small lamp 72 powered by any suitable source of electricity, preferably being connected in the circuit as shown in FIG. 4 so that it is illuminated by current from the battery 36 when the switch 38 is closed. Light from the lamp 72 cannot pass into the shutter housing 18 except through a small passageway 18b in a plug at the inner end of the lamp housing, and a corresponding small passageway 18c in the adjacent wall of the shutter housing 18.

Mounted in stationary position within the shutter housing is a photoresistance 70 in direct alignment with the passageways 18b and 18c so that, if there is no intermediate obstruction, light from the lamp 72 may pass along the passageways 18b and 18c and fall upon the photoresistance 70. This photoresistance is connected in the electronic circuit in the manner indicated in FIG. 4, and has a limit resistor 74 also connected as indicated. Most of the parts of this circuit are the same as the circuit in FIG. 2, and the elements are indicated by the same reference numerals as in FIG. 2, the difference being in the manner in which the impulse is produced on the base of the transistor 54 to make this transistor temporarily conductive.

In the shutter housing, the blade ring 24 has an opaque arm 24f extending circumferentially between the opening 18c and the photoresistance 70. This opaque arm is provided at one point with an opening or window 24g, which is slightly out of alignment with the light controlling apertures 18b and 18c when the blade ring 24 is in its normal tensioned or cocked position, being the same position shown in FIG. 1. Therefore, when the blade ring is in this tensioned position, light from the lamp 72 cannot reach the photoresistance 70. But as the blade ring 24 begins its counterclockwise running-down movement (when the trip or trigger 28 is actuated, closing the switch 38 and releasing the blade ring) the window 24g in the member 24f momentarily passes the light passage 18b, 18c and momentarily allows light from the lamp 72 to reach the photoresistance 70. This makes the photoresistance 70 momentarily conductive, so that a short pulse is transmitted to the base of the transistor 54, thus making the transistor momentarily conductive in order to dissipate the residual charge previously on the capacitor 46 and thereby to enable the new timing cycle to start. From this point on, the exposure operation and the timing thereof occurs in the same way as described in connection with the first embodiment.

In addition to the magnetic inductive form of gate disclosed in the first embodiment and the photoelectric form of gate disclosed in the second embodiment, it is also possible, according to the present invention, to use a capacitive gate for producing the impulse which temporarily renders the switching transistor 54 conductive. This is illustrated in FIG. 5, which shows schematically the mechanical parts of the capacitative gate, and also a wiring diagram of the electric circuit parts, so far as necessary to understand the circuit. FIG. 5 shows only the left-hand portion of the complete wiring diagram, since the right-hand portion (to the right of the switching transistor 54) is identical with the corresponding right-hand portion of FIG. 2, and thus need not be repeated.

In this capacitative form of gate, there is a capacitor having plates 80. Movable between these plates is a member 82 connected to the blade ring 24 to move therewith. This member 82 has a variation in its charge capacity, as indicated at 82a, such as a hole in a piece of metallic foil. When the blade ring 24 is in its tensioned or cocked position, the variation 82a is out of alignment with the plates 80 of the capacitor, as shown schematically. As the blade ring 24 begins its running-down movement, the variation 82a is momentarily brought into position between the plates 80, thereby momentarily varying the capacity of the capacitor, and then as the running-down movement of the blade ring continues, the structural variation or capacitative variation 82a moves on beyond the plates 80 and no longer influences the capacity of the capacitor.

The capacitor 80 is connected in the circuit in series with a high frequency generator 84 as shown. It will be understood that the leads at the top and bottom of FIG. 5 extend rightwardly to the battery 36 through the switch 38, just as in FIG. 2, although these parts are not illustrated in FIG. 5.

At the beginning of the running-down movement of the blade ring 24, the movement of the capacitative variation portion 82 momentarily into and then out of the space between the capacitor plates 80, causes momentary variation in the capacitance of this capacitor, so that an impulse from the high frequency generator 84 is momentarily impressed on the base of the switching transistor 54, thereby making this transistor momentarily conductive and serving to discharge the residual charge on the capacitor 46, so that the new timing cycle can then start. As in the other embodiments, this start of the timing cycle is in accurately timed relation to the running-down movement of the blade ring 24, independently of accidental variations such as might occur if a mechanical switch were used to initiate the operation of the timing cycle.

For the sake of clarity, the timing cycle circuit itself has been illustrated in rather simple form, since those skilled in the art will understand, from what has been said above, how this same principle of using an electronic switch rather than a mechanical switch to initiate the operation of the timing cycle can be applied to other and more complex forms of timing cycle circuits. For example, the above-described gates may be used for controlling an electric impulse-counting chain with frequency dividers, of the type disclosed, for example, in the present applicant's U.S. Pat. No. 3,348,462, granted Oct. 24, 1967. Also, in the case of reflex cameras, the mechanically movable member of the impulse gate (such as the member 24e in the first embodiment, the member 24f in the second embodiment, and the member 82 in the third embodiment) is not necessarily moved by the blade ring itself but may be moved by movements of the reflex mirror or of a member which is movably coupled with the reflex mirror.

What is claimed is:

1. A photographic camera comprising an electronic timing device adapted to be set into operation at a predetermined time and provided for controlling the timing of a photographic exposure, an electronic switch for determining said predetermined time, an electrical impulse for setting said electronic switch into operation, a gate for producing said electrical impulse, and a member running down from one end position to another end position with predetermined speed after releasing the camera to make an exposure and before setting said electronic timing device into operation, said gate being influenced by said member in the course of its running down movement for producing said electrical impulse and setting said electronic switch into operation.

2. A camera as defined in claim 1, further including at least one shutter blade, and a blade-operating member movable from a tensioned position to a rundown position to move said blade to make a photographic exposure, characterized by the fact that said member influencing said gate is coupled with said blade-operating member for the purpose of producing said electrical impulse at the beginning of the rundown movement of said blade operating member.

* * * * *